(12) United States Patent
Schreter

(10) Patent No.: US 10,235,422 B2
(45) Date of Patent: Mar. 19, 2019

(54) LOCK-FREE PARALLEL DICTIONARY ENCODING

(71) Applicant: Ivan Schreter, Malsch (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 1308 days.

(21) Appl. No.: 14/272,909

(22) Filed: May 8, 2014

(65) Prior Publication Data

US 2015/0324480 A1    Nov. 12, 2015

(51) Int. Cl.
*G06F 17/30*    (2006.01)

(52) U.S. Cl.
CPC .... *G06F 17/3053* (2013.01); *G06F 17/30324* (2013.01); *G06F 17/30504* (2013.01); *G06F 17/30864* (2013.01); *G06F 17/30952* (2013.01)

(58) Field of Classification Search
CPC ......... G06F 17/30864; G06F 17/30321; G06F 17/30613; G06F 17/30961; G06F 17/30067
USPC ....................................................... 707/741
See application file for complete search history.

(56) References Cited

U.S. PATENT DOCUMENTS

| | | | | |
|---|---|---|---|---|
| 2011/0161602 A1* | 6/2011 | Adams | ................... | G06F 9/526 711/148 |
| 2014/0222418 A1* | 8/2014 | Richtarsky | ........ | G06F 17/30312 704/10 |
| 2015/0149401 A1* | 5/2015 | Kottler | .............. | G06F 17/30489 707/602 |
| 2015/0278268 A1* | 10/2015 | El-Ali | ............... | G06F 17/30324 707/722 |

* cited by examiner

*Primary Examiner* — Michael Pham
(74) *Attorney, Agent, or Firm* — Buckley, Maschoff & Talwalkar LLC

(57) ABSTRACT

A system includes reception of a value, determination of whether the value is associated with a respective value identifier in a dictionary index associating each of a plurality of values with a respective value identifier, and in response to a determination that the value is not associated with a respective value identifier in the dictionary index: reservation of a slot of a reservation array comprising a plurality of slots, writing of the value into the reserved slot, insertion of a reserved value identifier of the reserved slot and a version counter of the reserved slot into a position of the dictionary index corresponding to the value, insertion of the value into a position of a dictionary vector storing a respective value in each of a plurality of vector positions, insertion of a first value identifier corresponding to the position of the dictionary vector into the position of the dictionary index corresponding to the value, and returning of the first value identifier.

21 Claims, 11 Drawing Sheets

| ~~~~ | 3 | ~~~~ | ~~~~ |
|------|---|------|------|
| ~~~~ | 2 | ~~~~ | ~~~~ |
| ~~~~ | 3 | ~~~~ | ~~~~ |
| ~~~~ | 3 | ~~~~ | ~~~~ |
| ~~~~ | 1 | ~~~~ | ~~~~ |
| ~~~~ | 4 | ~~~~ | ~~~~ |
| ~~~~ | 2 | ~~~~ | ~~~~ |
| ~~~~ | 2 | ~~~~ | ~~~~ |

|   | In Use | Value | Counter | Pointer |
|---|--------|-------|---------|---------|
| 1 |        |       |         |         |
| 2 |        |       |         |         |
| 3 | X      | Cherry | 123    |         |
| 4 |        |       |         |         |
| 5 |        |       |         |         |
| 6 |        |       |         |         |

600

| | In Use | Value | Counter | Link |
|---|---|---|---|---|
| 1 | | Cherry | 8883 | 3 |
| 2 | | | | |
| 3 | X | Cherry | 123 | 0 |
| 4 | | | | |
| 5 | | | | |
| 6 | | | | |

| | In Use | Value | Counter | Link |
|---|---|---|---|---|
| 1 | | Cherry | 8883 | 3 |
| 2 | | | | |
| 3 | X | Cherry | 123 | 0 |
| 4 | | | | |
| 5 | | Cherry | 75 | 1 |
| 6 | | | | |

*FIG. 12*

LOCK-FREE PARALLEL DICTIONARY ENCODING

BACKGROUND

Database tables include several values for each database record. Storage of these values typically consumes large amounts of memory (e.g., disk-based and/or Random Access Memory). The memory required to store the values may be reduced by storing smaller value IDs instead of the values themselves. In order to facilitate such storage, a dictionary is used which maps values into value IDs. Each unique value in the dictionary is associated with one unique value ID. Therefore, when a particular value is to be stored in a database record, the value ID for the value is determined from the dictionary and the value ID is stored in the record instead.

The dictionary can be represented as a vector or radix tree of values, where each vector element/radix tree leaf entry at position i contains the value corresponding to value ID i. Before adding a new value to the dictionary, it must be ensured that the new value is not already present in the dictionary. However, linearly scanning all values in the dictionary will scale poorly as the dictionary grows. A secondary structure, or dictionary index, may be used to check for duplicates. The dictionary index may be, for example, a hash map or tree-based map from value to value ID.

For single-threaded encoding, the dictionary index is checked for the existence of the value and, if found, its value ID is returned. If the value is not found in the dictionary index, the value is inserted into the dictionary vector and into the dictionary index as a mapping from the value to a new index in the dictionary vector, which is equivalent to the new value ID, and the new value ID is returned.

For parallel encoding, a lock can be taken to protect the dictionary during dictionary encoding. This lock is computationally expensive if several threads try to access the same dictionary. Improved lock-free parallel dictionary encoding systems are desired.

BRIEF DESCRIPTION OF THE DRAWINGS

FIG. 5 illustrates an encoded database column according to some embodiments.

FIG. 11 illustrates a reservation array according to some embodiments.

FIG. 12 illustrates a reservation array according to some embodiments.

DETAILED DESCRIPTION

Figure 1:
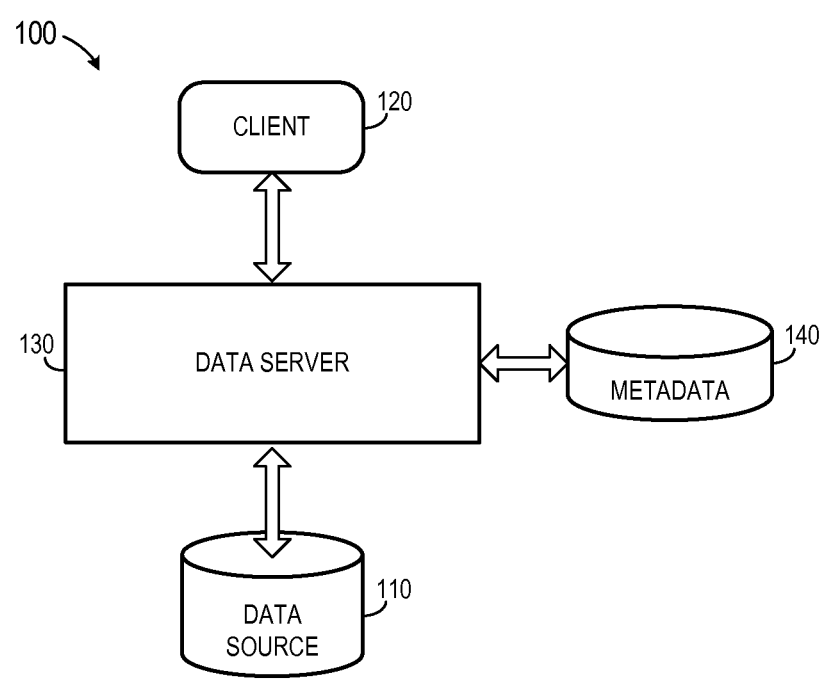
FIG. 1 is a block diagram of a system according to some embodiments.

FIG. 1 is a block diagram of system 100 according to some embodiments. System 100 includes data source 110, client 120, and data server 130. Data source 110 may comprise any query-responsive data source or sources that are or become known, including but not limited to a structured-query language (SQL) relational database management system. Data source 110 may comprise a relational database, a multi-dimensional database, an eXtendable Markup Language (XML) document, or any other data storage system storing structured and/or unstructured data. The data of data source 110 may be distributed among several relational databases, multi-dimensional databases, and/or other data sources. Embodiments are not limited to any number or types of data sources. For example, data source 110 may comprise one or more OnLine Analytical Processing (OLAP) databases, spreadsheets, text documents, presentations, etc.

In some embodiments, data source 110 is implemented in Random Access Memory (e.g., cache memory for storing recently-used data) and one or more fixed disks (e.g., persistent memory for storing their respective portions of the full database). Alternatively, data source 110 may implement an "in-memory" database, in which volatile (e.g., non-disk-based) memory (e.g., Random Access Memory) is used both for cache memory and for storing its entire respective portion of the full database. In some embodiments, the data of data source 110 may comprise one or more of conventional tabular data, row-based data stored in row format, column-based data stored in columnar format, and object-based data. Data source 110 may also or alternatively support multi-tenancy by providing multiple logical database systems which are programmatically isolated from one another. Moreover, the data of data source 110 may be indexed and/or selectively replicated in an index to allow fast searching and retrieval thereof.

Figure 2:
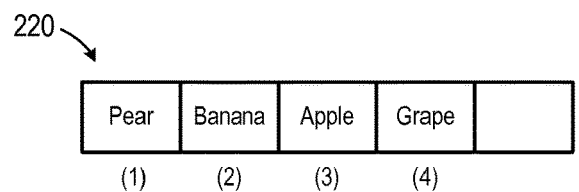
FIG. 2 illustrates a database column, a dictionary vector, and an encoded database column according to some embodiments.

Data source 110 may also store a dictionary vector as described above. FIG. 2 illustrates table 210, dictionary vector 220 and encoded table 230 stored in data source 110 according to some embodiments. Table 210 includes four columns, with column 215 including various values. Dictionary vector 220 is associated with column 215 and used for encoding the vales of column 215.

Each vector element at position i of dictionary vector 220 stores the value associated with value ID i. That is, value "Pear" is associated with value ID 1, value "Banana" is associated with value ID 2, etc.

Table 230 shows column 215 after encoding based on dictionary vector 220. Specifically, each occurrence of value "Pear" has been replaced by value ID 1, each occurrence of value "Banana" has been replaced by value ID 2, each occurrence of value "Apple" has been replaced by value ID 1, and each occurrence of value "Grape" has been replaced by value ID 4.

Metadata 140 may provide information regarding the structure, relationships and meaning of the data stored within data source 110. This information may be generated by a database administrator. According to some embodiments, metadata 140 includes data defining the schema of database tables stored within data source 110. A database table schema may specify the name of the database table, columns of the database table, the data type associated with each column, and other information associated with the database table.

Data server 130 generally provides data of data source 110 to reporting clients, such as client 120, in response to instructions (e.g., SQL statements) received therefrom. In some embodiments, data server 130 receives an instruction from client 120. Data server 130 generates a statement execution plan based on the instruction and on metadata 140. The statement execution plan is forwarded to data source 110, which executes the plan and returns a corresponding dataset. Data server 130 then returns the dataset to client 120. Embodiments are not limited thereto.

Client 120 may comprise one or more devices executing program code of a software application for presenting user interfaces to allow interaction with data server 130. Presentation of a user interface may comprise any degree or type of rendering, depending on the type of user interface code generated by data server 130. For example, client 120 may execute a Web Browser to receive a Web page (e.g., in HTML format) from data server 130, and may render and present the Web page according to known protocols. Client 120 may also or alternatively present user interfaces by executing a standalone executable file (e.g., an .exe file) or code (e.g., a JAVA applet) within a virtual machine.

Although embodiments are described with respect to system 100, which is a "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. System 100 may also or alternatively support multi-tenancy by providing multiple logical database systems which are programmatically isolated from one another.

Figure 3A:
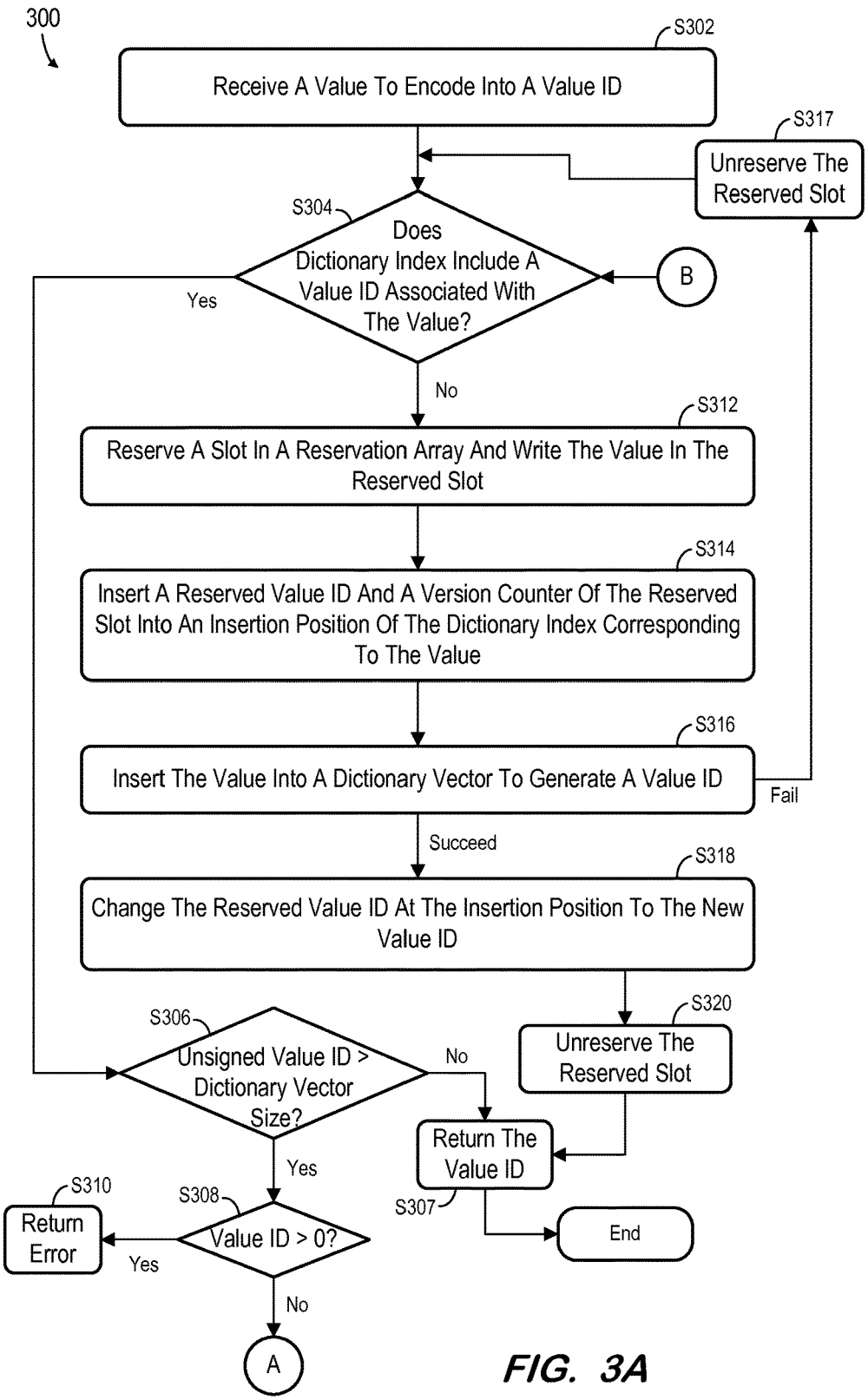
FIGS. 3A and 3B comprise a flow diagram of a process according to some embodiments.
Figure 3B:
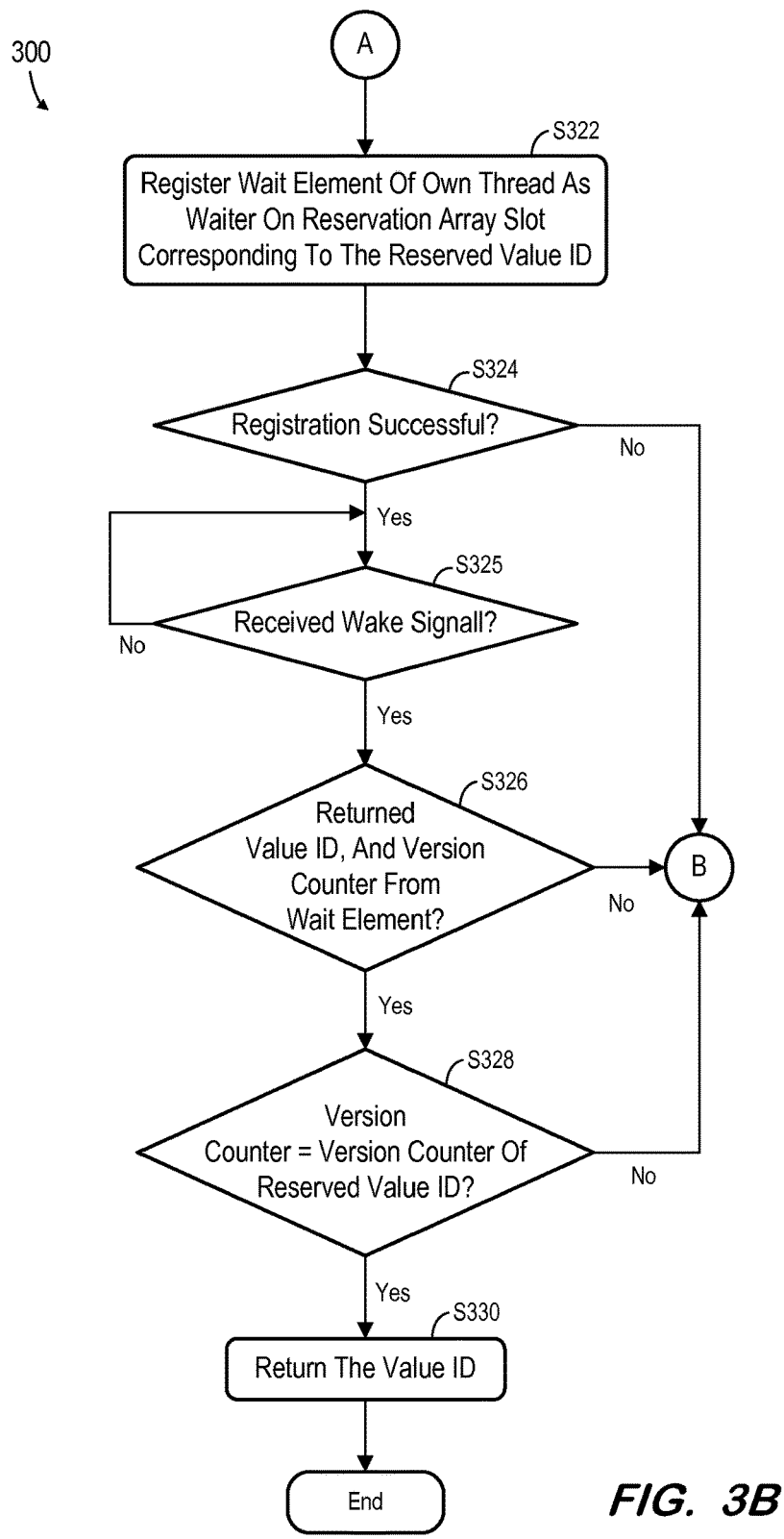

FIG. 3 comprises a flow diagram of process 300 according to some embodiments. In some embodiments, various hardware elements of data server 130 execute program code to perform process 300. Process 300 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 300 may be executed to determine a value ID based on an input value. For example, if a value is to be written to a database table, and the column to which the value is to be written is designated as encoded, process 300 may be executed to determine a value ID based on the value, after which the determined value ID is written to the database table instead of the value.

In this regard, a value to encode is initially received at S302. The value may be any value which is to be written to a database table, for any reason. Next, at S304, it is determined whether a dictionary index includes a value ID associated with a value. Contrary to conventional approaches described in the Background, the dictionary vector is not checked during Process 300 for the presence of the value because a time required for such a check would scale linearly with the size of the dictionary vector.

Figure 4:
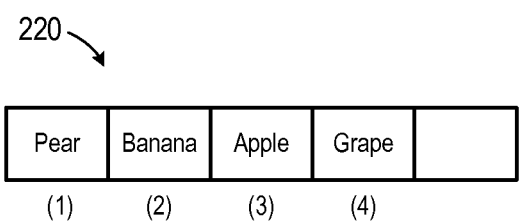
FIG. 4 illustrates a dictionary vector and a dictionary index according to some embodiments.
Figure 4:
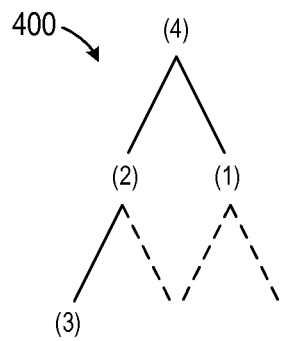

FIG. 4 illustrates dictionary vector 220 of FIG. 2 and corresponding dictionary index 400 according to some embodiments. Dictionary index 400 is a sorted tree structure, but embodiments are not limited thereto. Each entry of dictionary index 400 is a value ID, and the value IDs of dictionary index are sorted from left to right based on the alphabetical relationship of their corresponding values. For example, value ID 3 is associated with value "Apple". Since value "Apple" is first in alphabetical order among the values of dictionary vector 220, value ID 3 is the left-most value ID in tree 400. Similarly, since value "Pear" is last in alphabetical order among the values of dictionary vector 220, value ID 1 is the right-most value ID in tree 400.

The determination at S304, according to some embodiments, comprises looking up the value associated with the value ID at the apex of tree 400, and comparing the value with the value to be encoded. In the present example, it will be assumed that the value "Banana" is to be encoded. Accordingly, at S304, the value "Grape" is determined by looking up value ID 4 from dictionary vector 220. The value "Banana" is alphabetically "less than" the value "Grape", so the left branch of tree 400 is descended.

Value ID 2 is located on the descended branch, and is used to look up another value from dictionary vector 220. The associated value is "Banana", so the determination at S304 is positive and flow proceeds to S306.

At S306, it is determined whether an unsigned value of the value ID is greater than a size of the dictionary vector. This determination is executed to identify possible errors, because the unsigned value of a valid value ID cannot be greater than the size of the dictionary vector. In some embodiments, S306 may be replaced with a determination of whether the signed value ID is greater than or equal to zero and less than the dictionary size.

Flow proceeds to S308 if the absolute value of the value ID is greater than the size of the dictionary vector. If the value ID is determined to be a positive value at S308, an error is returned at S310. The determination at S308 is used to distinguish value IDs from "reserved" value IDs, which will be described in detail below.

Figure 5:
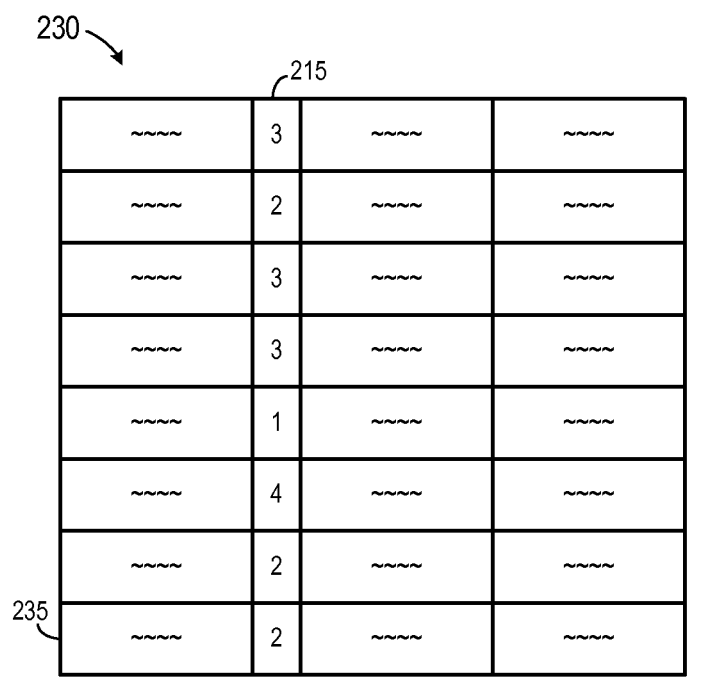

In the present example, the absolute value (i.e., 2) is not greater than the size of dictionary vector 220 (i.e., 4). Flow therefore proceeds to S307 and the value ID 2 is returned. The value ID may then be written to an associated table in lieu of the corresponding value. FIG. 5 illustrates encoded table 230 with the addition of new row 235. As shown, column 215 of row 235 includes the value ID 2, determined as described above.

An example will now be described in which the value "Cherry" is received at S302. At S304, the dictionary index is traversed as described above. Specifically, the value "Grape" is initially determined by looking up value ID 4 from dictionary vector 220 of FIG. 4. The received value "Cherry" is alphabetically "less than" the value "Grape", so the left branch of tree 400 is descended. Value ID 2 is then used to look up the value "Banana" from dictionary vector 220.

Since the value "Cherry" is alphabetically "greater than" the value "Banana", an attempt is made to traverse a right branch descending from the tree position which stores value ID 2. However, such a branch (and corresponding value ID) does not exist. Accordingly, it is determined at S304 that the dictionary index does not include a value ID associated with the value "Cherry". Flow therefore proceeds to S312.

Figures 6, 7:
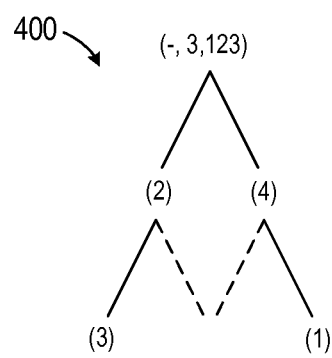
FIG. 6 illustrates a reservation array according to some embodiments.
FIG. 7 illustrates a dictionary index according to some embodiments.

At S312, a slot of a reservation array is reserved and the value is written into the reserved slot. FIG. 6 illustrates reservation array 600 according to some embodiments. In the illustrated example, each slot of reservation array includes columns associated with an in-use flag, a value, a counter and a pointer. The usage of each column according to some embodiments will be described below.

According to the present example, slot 3 of reservation array is identified at S312 based on a freelist, FIFO, a fixed assignment to the particular execution thread, etc. The value "Cherry" is written into the slot, its in-use flag is set, and its version counter is incremented.

Next, at S314, a reserved value ID and a version counter of the reserved slot are inserted into an insertion position of the dictionary index. The insertion position corresponds to the value received at S302.

According to some embodiments, value IDs are signed 32-bit values. "Normal" value IDs have a most significant bit of 0 and thirty-one remaining bits. "Reserved" value IDs have a most significant bit of 1. The next-most significant 8 bits are used for the slot ID, and the remaining 23 bits represent the counter. As mentioned above, both Normal and Reserved value IDs are reinterpreted as signed integers for the purposes of S306.

In view of the slot number (3=00000011$_2$) and counter value (123=1111011$_2$) of the FIG. 6 example, the reserved value ID inserted at S314 is 10000001100000000000000001111011.

The insertion position in the dictionary index depends upon the value (e.g., "Cherry"). The value is to be inserted at a position which maintains the sort order of the dictionary index. Inserting the reserved value ID at such a position may require changing the insertion position of other value IDs of the dictionary index, and/or changing the structure of the dictionary index (e.g., adding and/or removing branches).

FIG. 7 illustrates insertion of the reserved value ID at a position of dictionary index corresponding to the value "Cherry". The reserved value ID is represented by its sign bit, slot number (in decimal) and version counter (in decimal). Insertion of the reserved value ID required addition of a branch associated with value ID 1. From left to right, the value IDs of dictionary index of FIG. 7 correspond to values "Apple", "Banana", "Cherry", "Grape" and "Pear". Alphabetical order has therefore been maintained.

Figure 8:
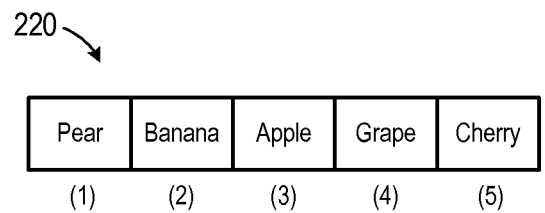
FIG. 8 illustrates a dictionary vector according to some embodiments.

Returning to process 300, the value is inserted into the dictionary vector in order to generate a value ID. The value is inserted into a next open position in the dictionary vector as illustrated in FIG. 8. As also illustrated in FIG. 8, this insertion results in generation of a value ID of 5 for the value "Cherry".

S316 may fail in a case that the generated value ID is already present in the dictionary (e.g., inserted by another thread in race condition). If so, flow continues to S317 to unreserve the reserved slot.

The reserved slot is unreserved at S317 by clearing its in-use flag and waking up any waiters registered on the reserved slot (i.e., parallel threads trying to insert the same value). This process consists of atomically unreserving the slot (e.g., returning the slot to the freelist, FIFO ring, etc.) and setting the waitlist head to zero, then walking the waitlist from the old value returned by the atomic operation performed to unreserve the slot and waking up any waiters in the list by signaling their wait element. Registration of wait elements and waiting for the signal are described with respect to FIG. 10.

Flow returns to S304 after S317, then to S306, and continues as described herein.

Figure 9:
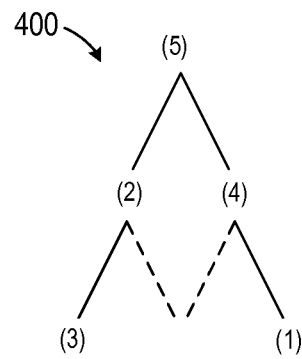
FIG. 9 illustrates a dictionary index according to some embodiments.

If the insertion at S316 is successful, the reserved value ID at the insertion position of the dictionary index is changed at S318 to the value ID which was generated at S316. Continuing the present example, FIG. 9 illustrates changing of the reserved value ID which was inserted into the apex of dictionary index 400 into the newly-generated value ID (i.e., 5).

The reserved slot is then unreserved at S320 as described above. However, at S320, waking up waiters in the list includes copying the new value ID and version counter into their registered wait element prior to signaling their wait element. Flow then proceeds to S307 to return the value ID, which may then be written to an associated table in lieu of the corresponding value.

An example will now be described in which the determination at S304 is affirmative (i.e., the dictionary index includes a value ID associated with the value to be encoded) and the determination at S308 is negative (i.e., the value ID is a reserved value ID). For example, it will be assumed that a value "Cherry" is received while dictionary index is 400 in the state illustrated in FIG. 7.

Flow therefore proceeds from S308 to S322, where a wait element of a current thread is registered as a waiter on the reservation slot corresponding to the reserved value ID. In the present example, the existing reserved value ID (i.e., -, 3, 123) is associated with reservation slot 3, so the wait element of the current thread is registered as a waiter on reservation slot 3.

Details of registration at S322 according to some embodiments are described below with respect to FIG. 10. If it is determined at S324 that the registration is not successful, flow returns to S304 to again determine whether the dictionary index includes a value ID associated with the value.

If the registration is successful, the wait element waits at S325 for a wake signal from the thread currently holding the slot. As described above, the new value ID and version counter are copied into the wait element prior to waking the wait element. Therefore, it is determined at S326 whether the wait element returned a value ID and version counter from the slot. If not, flow returns to S304 as described above. If so, it is determined at S328 whether the version counter returned at S326 is equal to the version counter of the reserved value ID determined at S304. If the determination is negative, flow returns to S304 as described above. If not, the value ID returned from the wait element is returned at S330.

Figure 10:
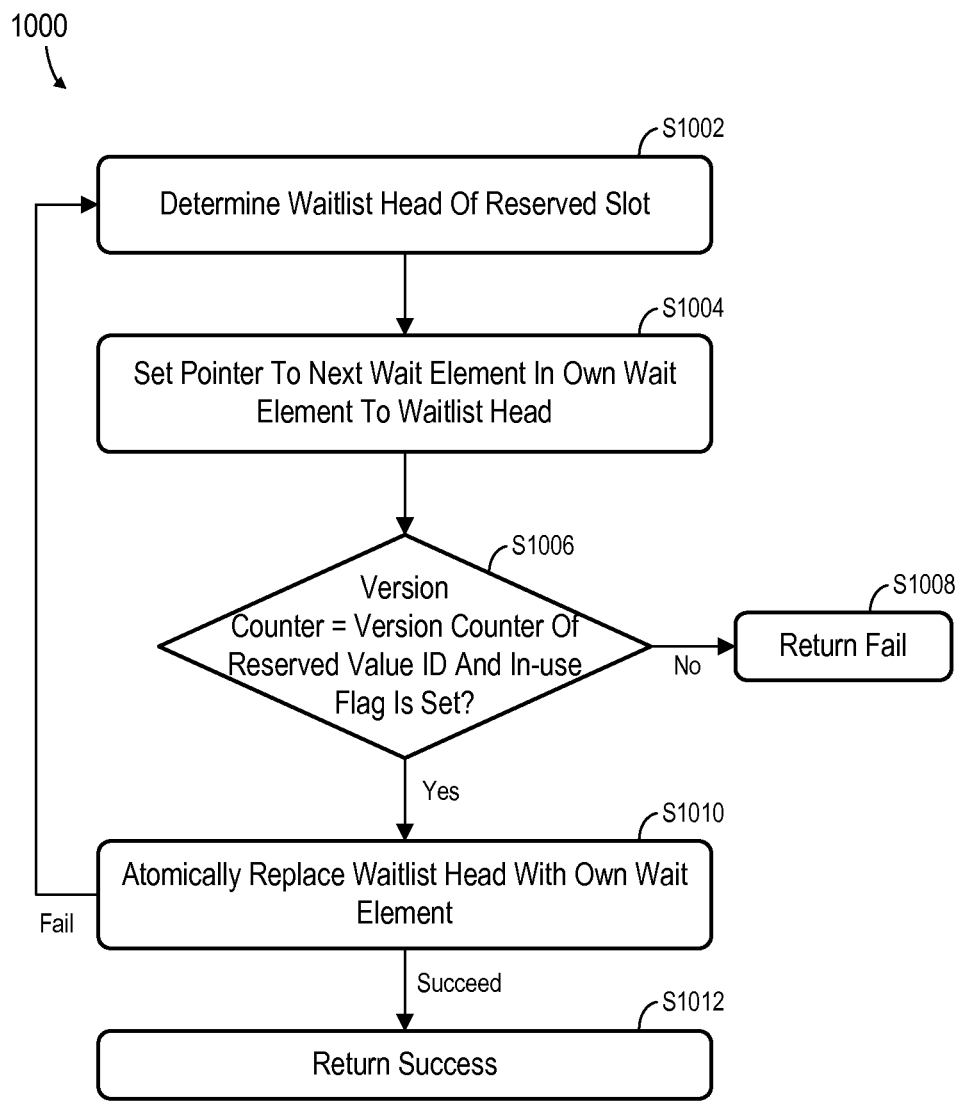
FIG. 10 is a flow diagram of a process according to some embodiments.

Process 1000 of FIG. 10 provides, according to some embodiments, registration of a wait element as mentioned with respect to S322. In describing process 1000, it will be assumed that, prior to process 1000 slot 3 of array 600 has been reserved as described above by a first execution thread, the value "Cherry" is received for encoding by a second execution thread, and a reserved ID value (-, 3, 123) is identified by the second execution thread from dictionary index 400 at S304.

A current waitlist head of the reserved slot (i.e., slot 3) is determined at S1002. For purposes of the present example, it will also be assumed that reservation array 600 includes the data shown in FIG. 11. Specifically, slot 3 includes the data of the prior example, and slot 1 also includes a value, counter and link. The data of slot 1 is generated by another execution thread which is attempting to encode the value "Cherry", and began its attempt prior to the second execution thread of the present example.

Based on the data stored in the link column of array 600, it is determined at S1002 that slot 1 is the current waitlist head of the reserved slot. Next, at S1004, the pointer to the next wait element in the wait element of the current execution thread is set to the old waitlist head. FIG. 12 illustrates setting a pointer of slot 5 to slot 1, the old waitlist head.

At S1006, it is determined whether the version counter of the reserved slot (i.e., slot 3) is equal to the counter of the reserved value ID and whether the in-use flag of the reserved slot is set. If not, a failure error is returned at S1008. If so, the waitlist head is replaced with the wait element of the current thread at S1010, and, if successful, a success message is returned at S1012. If not, flow returns from S1010 to S1002.

Figure 13:
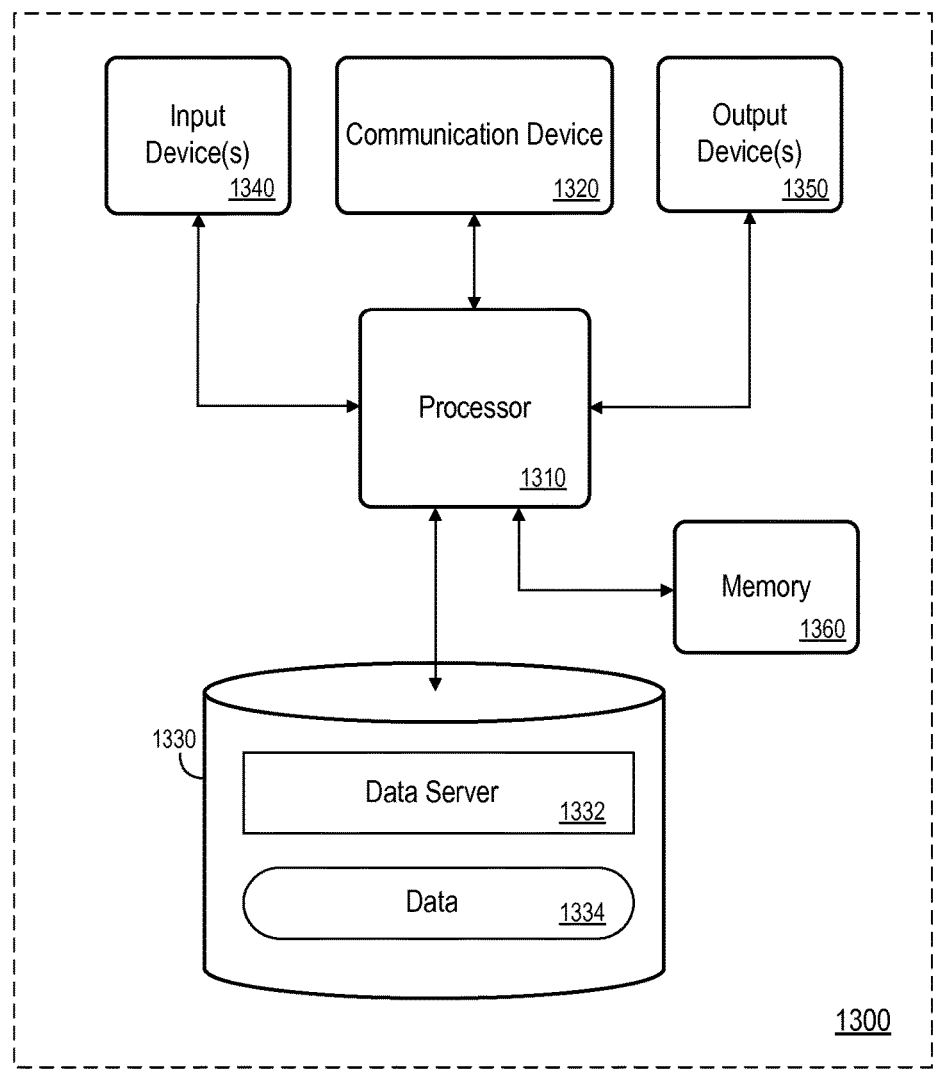
FIG. 13 is a block diagram of an apparatus according to some embodiments.

FIG. 13 is a block diagram of apparatus 1300 according to some embodiments. Apparatus 1300 may comprise a general-purpose computing apparatus and may execute program code to perform any of the functions described herein. Apparatus 1300 may comprise an implementation of data server 110 in some embodiments. Apparatus 1300 may include other unshown elements according to some embodiments.

Apparatus 1300 includes processor 1310 operatively coupled to communication device 1320, data storage device 1330, one or more input devices 1340, one or more output devices 1350 and memory 1360. Communication device 1320 may facilitate communication with external devices, such as a reporting client, or a data storage device. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into apparatus 1300. Output device(s) 1350 may comprise, for example, a display (e.g., a display screen) a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM).

Data server 1332 may comprise program code executed by processor 1310 to cause apparatus 1300 to perform any one or more of the processes described herein. Embodiments are not limited to execution of these processes by a single apparatus. Data may include conventional database data as described above. As also described above, database data (either cached or a full database) may be stored in volatile memory such as memory 1360. Data storage device 1330 may also store data and other program code for providing additional functionality and/or which are necessary for operation of apparatus 1300, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
 a memory storing:
  a dictionary index associating each of a plurality of values with a respective value identifier;
  a reservation array comprising a plurality of slots;
  a dictionary vector storing a respective value in each of a plurality of vector positions; and
  processor-executable process steps; and
 a processor to execute the processor-executable process steps to cause the system to:
  receive a value;
  determine whether the value is associated with a respective value identifier in the dictionary index; and
  in response to a determination that the value is not associated with a respective value identifier in the dictionary index:
   reserve a slot of the reservation array;
   write the value into the reserved slot;
   insert a reserved value identifier of the reserved slot and a version counter of the reserved slot into a position of the dictionary index corresponding to the value;
   insert the value into a position of the dictionary vector;
   insert a first value identifier corresponding to the position of the dictionary vector into the position of the dictionary index corresponding to the value;
   return the first value identifier;
  determine, in response to a determination that the value is associated with a respective value identifier in the dictionary index, whether the respective value identifier is a negative integer; and
  in response to a determination that the respective value identifier is a negative integer:
   determine a second slot of the reservation array corresponding to the respective value identifier;
   acquire a second value identifier and a version counter from the second slot;
   determine whether the acquired version counter is equal to a version counter of the respective value identifier; and in response to a determination that acquired version counter is equal to a version counter of the respective value identifier, return the second value identifier.

2. The system of claim 1, wherein the processor is further to execute the processor-executable process steps to cause the system to:
determine, in response to a determination that the value is associated with a respective value identifier in the dictionary index, whether an unsigned value of the respective value identifier is greater than a number of vector positions of the dictionary vector; and
in response to a determination that the unsigned value of the respective value identifier is not greater than a number of vector positions of the dictionary vector, return the respective value identifier.

3. The system of claim 1, wherein the reserved value identifier is a negative integer, and each of the respective value identifiers is a positive integer.

4. The system of claim 1, wherein the processor is further to execute the processor-executable process steps to cause the system to:
prior to acquisition of the second value identifier and the version counter from the second slot,
register a wait element of the current thread as a waiter on the reserved slot; and
wait for a wake signal.

5. The system of claim 4, wherein acquisition of the second value identifier and the version counter from the second slot comprises:
determination of a waitlist head of the second slot;
setting of a pointer to a next wait element, in a wait element of a current thread, to the waitlist head; and
atomic replacement of the waitlist head with the wait element of the current thread.

6. The system of claim 1, wherein acquisition of the second value identifier and the version counter from the second slot comprises:
determination of a waitlist head of the second slot;
setting of a pointer to a next wait element, in a wait element of a current thread, to the waitlist head; and
atomic replacement of the waitlist head with the wait element of the current thread.

7. The system of claim 1, including in response to the determination that the value is associated with the respective value identifier in the dictionary index, not checking the dictionary vector for the presence of the value.

8. A computer-implemented method comprising:
receiving a value;
determining whether the value is associated with a respective value identifier in a dictionary index associating each of a plurality of values with a respective value identifier; and
in response to determining that the value is not associated with a respective value identifier in the dictionary index:
reserving a slot of a reservation array comprising a plurality of slots;
writing the value into the reserved slot;
inserting a reserved value identifier of the reserved slot and a version counter of the reserved slot into a position of the dictionary index corresponding to the value;
inserting the value into a position of a dictionary vector storing a respective value in each of a plurality of vector positions;
inserting a first value identifier corresponding to the position of the dictionary vector into the position of the dictionary index corresponding to the value; and
returning the first value identifier;
determining, in response to determining that the value is associated with a respective value identifier in the dictionary index, whether the respective value identifier is a negative integer; and
in response to determining that the respective value identifier is a negative integer:
determining a second slot of the reservation array corresponding to the respective value identifier;
acquiring a second value identifier and a version counter from the second slot;
determining whether the acquired version counter is equal to a version counter of the respective value identifier; and
in response to determining that acquired version counter is equal to a version counter of the respective value identifier, returning the second value identifier.

9. The computer-implemented method of claim 8, further comprising:
determining, in response to determining that the value is associated with a respective value identifier in the dictionary index, whether the an unsigned value of the respective value identifier is greater than a number of vector positions of the dictionary vector; and
in response to determining that the unsigned value of the respective value identifier is not greater than a number of vector positions of the dictionary vector, returning the respective value identifier.

10. The computer-implemented method of claim 8, wherein the reserved value identifier is a negative integer, and each of the respective value identifiers is a positive integer.

11. The computer-implemented method of claim 8, further comprising:
prior to acquisition of the second value identifier and the version counter from the second slot, registering a wait element of the current thread as a waiter on the reserved slot; and
waiting for a wake signal.

12. The computer-implemented method of claim 11, wherein acquiring the second value identifier and the version counter from the second slot comprises:
determining a waitlist head of the second slot;
setting a pointer to a next wait element, in a wait element of a current thread, to the waitlist head; and
atomically replacing the waitlist head with the wait element of the current thread.

13. The computer-implemented method of claim 8, wherein acquiring the second value identifier and the version counter from the second slot comprises:
determining a waitlist head of the second slot;
setting a pointer to a next wait element, in a wait element of a current thread, to the waitlist head; and
atomically replacing the waitlist head with the wait element of the current thread.

14. The computer-implemented method of claim 8, including in response to the determination that the value is associated with the respective value identifier in the dictionary index, not checking the dictionary vector for the presence of the value.

15. A non-transitory computer-readable medium storing program code, the program code executable by a computer system to cause to the computer system to:
receive a value;

determine whether the value is associated with a respective value identifier in a dictionary index associating each of a plurality of values with a respective value identifier; and in response to determining that the value is not associated with a respective value identifier in the dictionary index:

reserve a slot of a reservation array comprising a plurality of slots;

write the value into the reserved slot;

insert a reserved value identifier of the reserved slot and a version counter of the reserved slot into a position of the dictionary index corresponding to the value;

insert the value into a position of a dictionary vector storing a respective value in each of a plurality of vector positions;

insert a first value identifier corresponding to the position of the dictionary vector into the position of the dictionary index corresponding to the value; and return the first value identifier;

determine, in response to a determination that the value is associated with a respective value identifier in the dictionary index, whether the respective value identifier is a negative integer; and in response to a determination that the respective value identifier is a negative integer:

determine a second slot of the reservation array corresponding to the respective value identifier;

acquire a second value identifier and a version counter from the second slot;

determine whether the acquired version counter is equal to a version counter of the respective value identifier; and in response to a determination that acquired version counter is equal to a version counter of the respective value identifier, return the second value identifier.

16. The medium of claim 15, the program code further executable by a computer system to cause to the computer system to:

determine, in response to determining that the value is associated with a respective value identifier in the dictionary index, whether an unsigned value of the respective value identifier is greater than a number of vector positions of the dictionary vector; and in response to a determination that the unsigned value of the respective value identifier is not greater than a number of vector positions of the dictionary vector, return the respective value identifier.

17. The medium of claim 15, wherein the reserved value identifier is a negative integer, and each of the respective value identifiers is a positive integer.

18. The medium of claim 15, the program code further executable by a computer system to cause to the computer system to:

prior to acquisition of the second value identifier and the version counter from the second slot, register a wait element of the current thread as a waiter on the reserved slot; and wait for a wake signal.

19. The medium of claim 18, wherein acquisition of the second value identifier and the version counter from the second slot comprises:

determination of a waitlist head of the second slot;

setting of a pointer to a next wait element, in a wait element of a current thread, to the waitlist head; and atomic replacement of the waitlist head with the wait element of the current thread.

20. The medium of claim 15, wherein acquisition of the second value identifier and the version counter from the second slot comprises:

determination of a waitlist head of the second slot;

setting of a pointer to a next wait element, in a wait element of a current thread, to the waitlist head; and atomic replacement of the waitlist head with the wait element of the current thread.

21. The medium of claim 15, including in response to the determination that the value is associated with the respective value identifier in the dictionary index, not checking the dictionary vector for the presence of the value.

* * * * *